US009020525B2

United States Patent
Murphy et al.

(10) Patent No.: US 9,020,525 B2
(45) Date of Patent: Apr. 28, 2015

(54) METHOD AND SYSTEM FOR MOBILE REFERENCE SIGNATURE GENERATION

(71) Applicant: JDSU UK Limited, Basingstoke (GB)

(72) Inventors: Christopher Murphy, Bath (GB); Michael Joseph Flnagan, Chester, NJ (US); Peter Kenington, Chepstow (GB)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 13/719,179

(22) Filed: Dec. 18, 2012

(65) Prior Publication Data

US 2014/0171103 A1 Jun. 19, 2014

(51) Int. Cl.
*H04W 4/02* (2009.01)
*H04W 64/00* (2009.01)
*H04W 24/08* (2009.01)

(52) U.S. Cl.
CPC ............ *H04W 4/021* (2013.01); *H04W 64/00* (2013.01); *H04W 24/08* (2013.01)

(58) Field of Classification Search
USPC ......... 705/3; 455/67.11, 423, 456.1; 370/329, 370/432, 489
See application file for complete search history.

(56) References Cited

U.S. PATENT DOCUMENTS

| 2004/0176040 | A1 | 9/2004 | Thornton et al. ........ 455/67.11 |
| 2006/0126556 | A1* | 6/2006 | Jiang et al. ................ 370/328 |
| 2009/0181664 | A1* | 7/2009 | Kuruvilla et al. ............ 455/423 |
| 2009/0286550 | A1 | 11/2009 | Weinroth ................ 455/456.1 |
| 2010/0127887 | A1 | 5/2010 | Ledlie et al. ................. 340/8.1 |
| 2011/0222475 | A1* | 9/2011 | Hole et al. .................. 370/328 |
| 2012/0245955 | A1* | 9/2012 | Bari et al. ....................... 705/3 |
| 2013/0039194 | A1* | 2/2013 | Siomina et al. .............. 370/252 |

FOREIGN PATENT DOCUMENTS

WO 2011042590 4/2011 ............ H04W 16/14

OTHER PUBLICATIONS

European Search Report from corresponding EP application No. 13197807.4.

* cited by examiner

*Primary Examiner* — Myron K Wyche
(74) *Attorney, Agent, or Firm* — JDS Uniphase Corporation

(57) ABSTRACT

A method and an apparatus for generating reference signatures in a cellular wireless communications system are provided. A first signature is obtained for a mobile communication unit at a first location. The first signature comprises first location information, a first timestamp, and radio frequency measurement information, but lacks identification information. The first signature is compared to signatures in a database, to identify a second signature having location information and a timestamp corresponding to the first location information and first timestamp. A reference signature is created by combining at least part of the first signature, such as the radio frequency information, with the second signature. The first signature is from an anonymized call. The second signature may be from an application operational on the communication unit, or from a social media website, and may comprise identification information for the communication unit or user.

18 Claims, 7 Drawing Sheets

METHOD AND SYSTEM FOR MOBILE REFERENCE SIGNATURE GENERATION

CROSS REFERENCE TO RELATED U.S. APPLICATIONS

This application is related to co-pending U.S. patent application Ser. No. 13/719,166, entitled MOBILE GEOLOCATION and also co-pending U.S. patent application Ser. No. 13/719,189, entitled MOBILE COMMUNICATION SYSTEM, both filed Dec. 18, 2012, and the disclosures of which are both incorporated herein by reference.

FIELD OF THE INVENTION

The field of the invention relates to a system and method for generating reference signatures in a mobile communication system

BACKGROUND OF THE INVENTION

Wireless communication systems, such as GSM and the 3rd Generation (3G) of mobile telephone standards and technology, are well known. An example of 3G standards and technology is the Universal Mobile Telecommunications System (UMTS™), developed by the 3rd Generation Partnership Project (3GPP™) (www.3gpp.org).

The $3^{rd}$ and $4^{th}$ generations of wireless communications, and in particular systems such as LTE, have generally been developed to support macro-cell mobile phone communications. Here the 'phone' may be a smart phone, or another mobile or portable communication unit that is linked wirelessly to a network through which calls are connected. Henceforth all these devices will be referred to as mobile communication units. 'Calls' may be data, video, or voice calls, or a combination of these. An increasing proportion of communications involves data rather than voice, and is technically referred to as being a 'connection', rather than a 'call'.

Macro cells utilise high power base stations to communicate with wireless communication units within a relatively large geographical coverage area. The coverage area may be several square kilometers, or larger if it is not in a built-up area.

Typically, mobile communication units communicate with each other and other telephone systems through a network. In a 3G system, this is the 'Core Network' of the 3G wireless communication system, and the communication is via a Radio Network Subsystem. A wireless communication system typically comprises a plurality of Radio Network Subsystems. Each Radio Network Subsystem comprises one or more cells, to which mobile communication units may attach, and thereby connect to the network. A base station may serve a cell with multiple antennas, each of which serves one sector of the cell. Often a cellular wireless communication system is described as comprising two parts: the network; and the mobile communication units.

FIG. 1 provides a perspective view of one prior art wireless communication system 100. The system of FIG. 1 comprises a network of base stations, comprising BS1 with reference 110, BS2 with reference 120, BS3 with reference 130, BS4 with reference 140 and BS5 with reference 150. Only one mobile communication unit 105 is shown. In a real network, there may be anywhere from thousands to millions of mobile communication units.

A base station such as base station 110 communicates with mobile communication unit 105. Base station 110 allows mobile communication unit 105 to place calls through the network, and receive calls routed through the network to base station 110.

Base station 140 has been shown as having a coverage area 142. If base station 140 had an omnidirectional antenna, and the terrain were flat, then coverage area 142 might be circular. However, both the shape and extent of the coverage areas of a typical base station depend on many variables, and may change with time.

Controller 160 manages calls within the wireless communication system 100. Controller 160 would be linked to all the base stations BS1-BS5, but the links are not shown in order to keep FIG. 1 simple to interpret. Controller 160 may process and store call information from the base stations shown in FIG. 1, plus many other base stations not shown in FIG. 1. In a UMTS network, controller 160 may be linked to the base stations via one or more Radio Network Subsystems.

There may be significant advantage in knowing where in wireless communication system 100 a mobile communication unit 105 is located. Prior art wireless communication systems have provided a variety of solutions to the problem of 'geolocating' mobile communication unit 105. One known solution involves providing specific equipment within the mobile communication unit that can measure location, such as a GPS unit. However, many users switch off the GPS function on their mobile communication units. Partly as a consequence, reported GPS details are highly infrequent. As little as one call in ten-thousand connections might report a GPS coordinate.

One prior art solution indicates that absolute power transmission levels can be used to geo-locate the mobile station. See for example "Mobile Cellular Location Positioning: An Approach Combining Radio Signal Strength Propagation and Trilateration", M. F. Khan, Masters Thesis, University of Johannesburg, November 2009 which is herein incorporated by reference in its entirety. However, power measurements in event-driven technologies, such as LTE, can be relatively infrequent. Even where a system or mobile communication unit has the capability of performing geolocation based on absolute power measurement, it may remain very important to make use of whatever alternate sources of information are also available.

Co-pending U.S. patent application Ser. No. 13/311,132, with applicant reference OPT004P326, entitled 'System and Methods of Mobile Geolocation', was filed on 5 Dec. 2011 is hereby incorporated by reference in their entirety and indicates that differential power levels can be used to geo-locate a mobile unit. A mobile communication unit provides a measurement of the difference in signal strengths that it receives from at least two base stations. The difference value can be compared to one or more contours of constant power difference, for signals received by subscriber mobile communication units in the system. An estimate of location can be obtained from this comparison. However, differential power techniques can be limited in scenarios where there are few pilot signals to make use of.

Patent application WO2010/083943A, which is also incorporated by reference in its entirety, shows a further technique, which uses signal strength and timing data derived from the mobile communication unit itself, along with network configuration data provided by the network operator, to locate the mobile communication unit.

Co-pending U.S. patent application Ser. No. 13/369,591, with applicant reference OPT004P330, entitled 'Mobile Geolocation', filed on 9 Feb. 2012, which is herein incorporated by reference in their entirety indicates that a database of 'known' signatures can be used to aid in locating a mobile communication unit operating in a mobile communication system. Each known signature comprises a location measurement or estimate, together with radio frequency and other measurements that were obtained by a mobile communication unit at that location at a particular time. Examples of the 'other measurements' that may be obtained by a mobile communication unit are: control information; a set of cells observable by the first mobile communication unit; and received power level information, for signals received from the observable cells.

The use of this database of known signatures enables position estimates to be derived, at least for any mobile communication units that report similar values of the radio frequency and other measurements to those of a known signature. When a 'match' of such similar values is found, the mobile communication unit concerned can therefore be assumed to be at the location at which the known signature was recorded.

U.S. patent application Ser. No. 13/369,591 also employs 'context information'. Context information links successive known signatures in the database. When two or more signatures are received from a mobile communication unit whose location is unknown, those signatures can be correlated against two or more signatures in the database that are linked by context information.

The invention of U.S. patent application Ser. No. 13/369,591 only allows the estimation of the position of a mobile communication unit if there is a match between a known signature in the database and the values of the radio frequency and other measurements reported by that mobile communication unit. This approach therefore relies on the database having many known signatures. For a cellular two-way radio system, the database may require hundreds of thousands or millions of known signatures. Obtaining these known signatures may be difficult. One approach is to collect signatures having location information by employing 'drive testing' and/or 'indoor-walk-testing'. Such testing relies on moving a test mobile communications device through a network, in order to collect accurate position measurements from the mobile communication unit and at the same time measure, for those positions, the values of radio frequency and other measurements.

Drive-testing and indoor-walk-testing have the disadvantages that:

(i) Drive- and walk-test signatures may not be easily obtained in the areas most frequented by actual users. This is because some areas are not accessible for either drive- or walk-testing, such as private company premises.

(ii) Signatures can be expensive to obtain over extensive areas.

Signatures obtained from drive- or walk-testing can be augmented by selecting data from the Operation Support System (OSS) of the mobile communication system. The OSS holds measurements made by many or all of the subscriber mobile communication units that operate in a mobile communication system. Some or all of the calls made during drive- or walk-testing will result in a record being created in the OSS. In some systems, the record of the call from the test mobile communications device and the corresponding record from the OSS both contain identification information for the test mobile communications device. If this is the case, then the common identification information can be used. If the correct individual record can be retrieved from the OSS by matching its identification information with the identification information for the test mobile communications device used in the drive or walk testing, then the records can be combined. In particular, the record retrieved from the OSS may contain measurements made by the mobile communication system that can be added to the record of the same call that was made by the test mobile communications device itself as part of drive or walk testing.

Thus the identification information in both records allows the two records to be identified as being from the same mobile communication unit. This may in turn then allow the two records to be synthesised into a more comprehensive signature than was obtained directly from the test mobile communications device.

Cellular wireless communication systems have faced the disadvantages that signatures may be expensive to obtain by known methods, and may not be representative of the areas where users make calls. Hence, there is a need for an improved method for generating reference signatures in a mobile communication system, such as an LTE, GSM or UMTS network.

Users of cellular wireless communication systems may interact with other users and the internet via various platforms. One type of platform is a social media website. With the user's permission, the user's mobile communication unit may provide updates to a social media website, without direct intervention by the user.

An alternative interaction is provided by phone applications, usually referred to as 'apps'. Various phone apps facilitate an enormous range of tasks, and usually involve users of mobile communication units providing some data during the course of using the phone apps. However, many users turn off functionality that may provide useful information, so the quality and quantity of information provided by phone apps varies widely.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
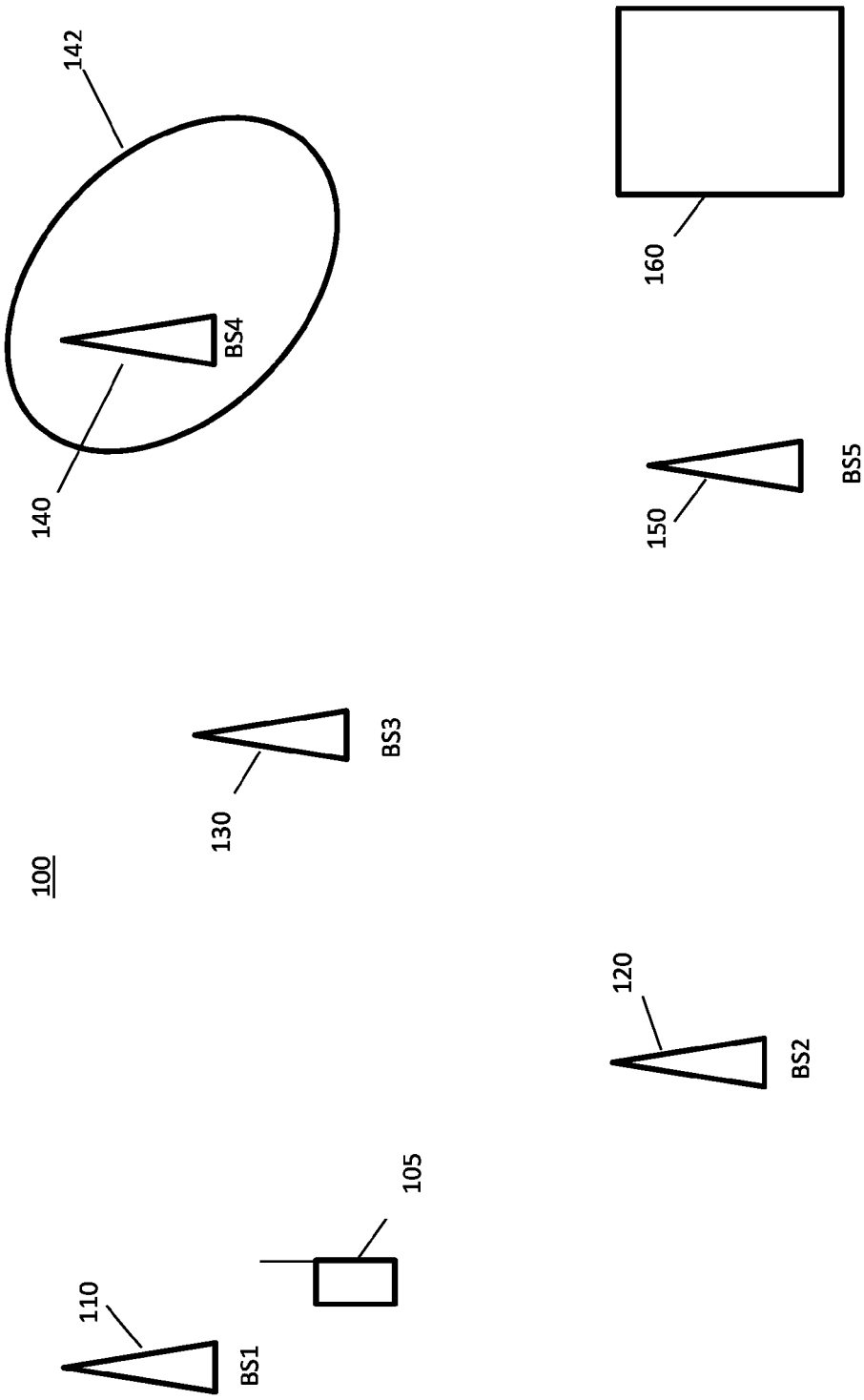
FIG. 1 is a schematic diagram, illustrating a prior art cellular wireless communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION OF THE ILLUSTRATIVE EMBODIMENTS

Before describing in detail embodiments that are in accordance with the present invention, it should be observed that the embodiments reside primarily in combinations of method steps and apparatus components related to a computer camera lighting system and method. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "compromising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints preclude the existence of additional identical elements in the process, method, article or apparatus that comprises the element.

A cellular wireless communication system and a method of generating reference signatures for use in geolocation in a cellular wireless communications system are provided. The cellular wireless communication system may, for example, operate in accordance with the GSM, UMTS or LTE standards.

A method of generating reference signatures for use in geolocation in a cellular wireless communications system comprises obtaining a first signature for a mobile communication unit at a first location, the first signature comprising first location information, a first timestamp, and radio frequency measurement information, but not containing identification information for the mobile communication unit that obtains the first signature. The first location information and the first timestamp of the first signature are compared to location information and timestamp information of signatures in a database. This allows the identification of a second signature from the database, the second signature having second location information and a second timestamp that correspond to the first location information and the first timestamp. Based on this comparison, a first reference signature is created by combining at least a part of the first signature with at least a part of the second signature. Henceforth the term 'app database' will be used for the database that stores the second signature and the remainder of the signatures, against which the signature is compared.

The first signature may be from an anonymized call, the anonymized call being obtained in accordance with the Minimization of Drive Test 3GPP standard. The 3GPP Minimisation of Drive Test standard is explained in standards documents 3GPP TS 37.320 and TS 32.422.

The second signature and the remainder of the signatures in the app database may be obtained directly from an application that is operational on the mobile communication unit. The second signature may instead be from a social media website. The signatures in the app database will also comprise identification information for the mobile communication unit and/or a user of the mobile communication unit. There will be very large numbers of such signatures in the app database, from many users and mobile communication units. This database will henceforth be referred to as the 'app database'.

By repeating this method, enough reference signatures can be derived for the collection of reference signatures to be used for geolocation. A measurement report received from a mobile communication unit that lacks a position measurement can be geolocated by comparison against the accumulated collection of reference signatures. The cellular wireless communications system can be arranged to continually generate new reference signatures, to add to the collection of reference signatures available for geolocation.

Creating the first reference signature may further comprise combining at least a part of the radio frequency measurement information of the first signature with at least a part of the second signature selected from the app database. The radio frequency measurement information may comprise several different measurements, and in some embodiments not all may be used. One approach to this is to add the radio frequency measurement information of the first signature into the app database holding the second signature. The second signature may comprise a user identifier, and at least one of the following types of control information not included in the first signature: timing advance; burst throughput rate; dynamic rate control, comprising at least channel quality indicators; signal-to-noise ratio. The radio frequency measurement information of the first signature may comprise at least one selected from: signal quality; and a cell identifier and corresponding observed power level. There may be more than one observed power level available, each for a corresponding cell.

The location information of the first signature, and possibly its timestamp, may also be added to the second signature in the app database, to create the first reference signature. As a result, the reference signature in the database may have:

(i) the first and second location information;

(ii) the first and second timestamps, which may be identical or almost identical;

(iii) the radio frequency measurements from the first signature;

(iv) any radio frequency measurements available with the second signature.

By repeating the method of the invention, therefore, it is possible either to enrich the signatures in the app database, or to create a separate database of enriched reference signatures. The resulting collection or set of reference signatures is then available for many purposes. One use of the reference signatures is to search them for a match with another, unknown signature, i.e. one for which there is no location measurement. This geolocation approach allows an estimate of the location of the unknown signature. Such unknown signatures may be obtained some time after creation of the enriched database of signals, and may be from mobile communication units whose current location is unknown but needed.

A variety of sources may provide the first signature. However, the first signature may be taken from a database of records of anonymized calls, which will henceforth be referred to as the 'anonymised database'. The call records in the anonymized database have been recorded without any information about the user or the mobile communication unit that made the call to which the signatures relate. An example of an anonymized call database is a database compiled in accordance with the Minimization of Drive Test 3GPP standard. Known approaches, in contrast, have considered anonymized call databases to have been only of limited use. Such anonymised databases are 'rich' in location information about where a mobile communication unit was located when it made a call. However, they can be considered to be limited databases in the sense that they typically lack user identity information. However, each anonymized signature has, at least, information about received powers and serving cells that were visible to the mobile communication unit that made the location measurement.

Such an anonymised database may contain large numbers of signatures, each with a location estimate. The invention may allow many signatures from such an anonymized database to be matched to the corresponding signatures for the same calls in the app database. Hence the invention may match and combine large numbers of signatures from the anonymized database and the app database, to create a new database of new reference signatures. The new reference signatures may be obtained far more rapidly, and at lower cost, than known methods of generating reference signatures, such as drive testing.

At its simplest level, therefore, the present invention links a 'first' signature from the anonymised call database with another record of the same call by the same mobile communication unit, the other record being the second signature referred to above in the app database. Although the first signature has no identification information of the mobile communication unit that provided the signature, the first signature has sufficient information to enable the corresponding second signature to be singled out as a 'match'. The second signature is in effect being identified from among very many potential candidates in the app database.

Although the invention has been described as involving an attempt to match a first signature from the anonymized database to 'signatures' from the app database, this approach needs to be viewed in its widest sense. For example, an attempt may simply be made to find any timestamp in the app database that matches the timestamp of the first signature taken from the anonymized database. If a single match is immediately found, then the 'first reference signature' can be created from the first signature and the corresponding 'second' signature from the app database. Next, the timestamp of another signature from the anonymized database is compared to the timestamps of signatures in the app database, and a second new reference signature is created when a match is found. However, the attempt to match the first signature may only be made against a selected plurality of signatures from the app database, i.e. not against all signatures in the app database. The step of selecting of a plurality of signatures for comparison to the first signature may be done using a subset of the values held in any of the fields of the signatures in the app database. So, for example, the signatures may be selectable by date, in which case the timestamp of the first signature need only be compared with the timestamps of signatures in the app database that were collected on the relevant date.

Considering in more detail an example of 'matching' the first and second signatures, the first signature from the anonymized database comprises first location information and a first timestamp. The uniqueness of the first location information and the precision of the first timestamp recording (typically in milliseconds) permit a precise matching between the first and second signatures. The timestamp of the first signature may match exactly, to the millisecond, with a second reference signature against which the first signature is compared. On rare occasions, the timestamp of the first signature may match exactly, to the millisecond, with two or more of a plurality of signatures from the app database, against which the first signature was compared. In these cases, the location data and any comparable RF measurements can be used to find which of the two or more signatures from the plurality does correspond to the first signature. For example, in some instances, the radio frequency measurement information of the first signature may also match any radio frequency measurements included in the second signature, which further increases confidence in the match between the first and second signatures. If this fails, then no reference signature will be created from the first signature, just as is the case when no matches at all are found between the first signature and any of the signatures from the app database.

At any given time in a large mobile communication system, a cell may serve hundreds or even tens of thousands of mobile communication units. Even in such systems, the invention may allow unique identification of call records, by matching the location information and timestamps of the records, i.e. of the 'first' and 'second' signatures.

The type of information contained in a 'location-rich', but 'information-poor' anonymized database is often infrequently available, so such databases may be relatively sparsely populated. For example, there may only be entries in the anonymized database for calls that occurred under certain RF-related handoff trigger conditions. The entries in the anonymized database are created generally much less often than non-RF control data would be provided for calls from a mobile communication unit. So only a subset of all calls from the mobile communication unit will result in a signature being created in the location-rich, information-poor anonymized database.

In contrast to this, an application on the mobile communication unit, for example, may provide very large numbers of signatures that can be included in the app database. This will particularly be the case where an app is installed on the mobile communication unit specifically to create signatures for the app database of the present invention.

Figure 2:
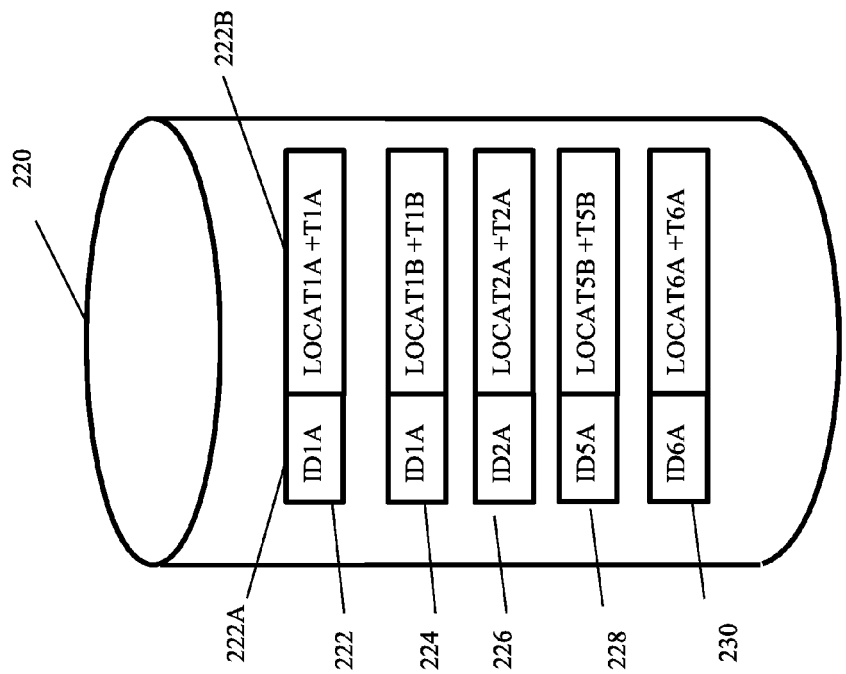
FIG. 2 is a schematic diagram, illustrating two databases for a cellular wireless communication system.
Figure 2:
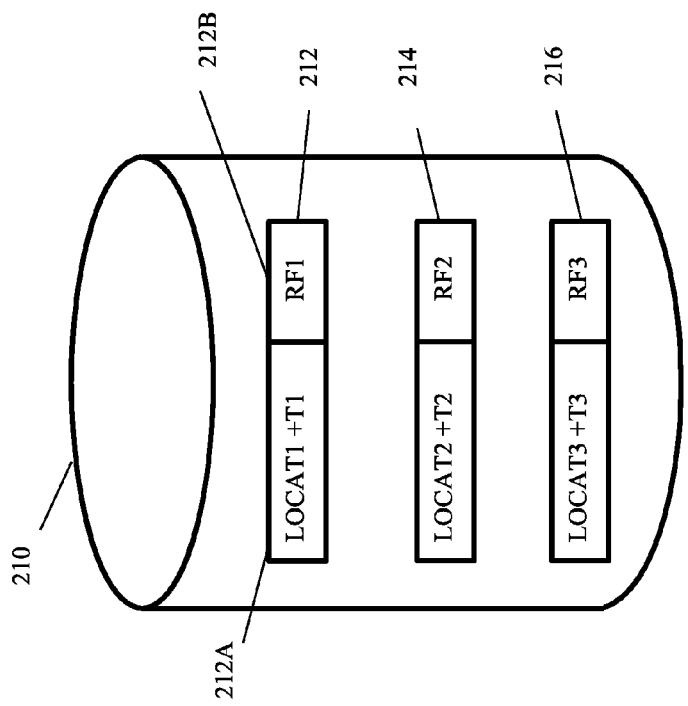

FIG. 2 provides an exemplary illustration of two databases. Anonymised database 210 comprises signatures 212, 214, 216, which are recorded successively later in time, in this example.

Anonymised database 210 may, for example, store signatures generated when a mobile communication unit is selected to contribute anonymously to a 'Minimisation of Drive Test' database. The selection of the mobile communication unit and call or data connection for inclusion in the 'Minimisation of Drive Test' database might be done at random. This indicates how little control a user may have over the signatures actually recorded in an anonymized database. The resulting signature recorded in anonymised database 210 comprises: (i) location information, such as a location coordinate, which might be supplied by GPS; (ii) a timestamp; (iii) RF information, such as power levels and observed cells.

Only when a mobile communication unit is actively engaged in collecting 'Minimisation of Drive Test' data, therefore, would it routinely provide location information such as that in signatures 212, 214, 216. Otherwise, when not engaged in collecting Minimisation of Drive Test data, mobile communication units might typically provide location information for only one out of every ten-thousand calls or connections.

Signature 212 contains location information 'LOCAT1' and timestamp 'T1', in first portion 212A. A second portion 212B contains RF information 'RF1'. Signature 214 is similarly divided, into a portion containing LOCAT2 and T2, and a portion containing RF2. Signature 216 is similarly divided, into a portion containing LOCAT3 and T3, and a portion containing RF3.

App database 220 comprises signatures 222, 224, 226, 228 and 230. Signatures 222, 224, 226, 228 and 230 may also have been recorded at successively later points in time. The identification field 222A of signature 222 is shown as comprising identification data ID1A. The identification field may, for example, comprise the International Mobile Subscriber Identity (IMSI) number of the mobile communication unit concerned. A second portion 222B contains location information 'LOCAT1A' and timestamp 'T1A'.

Signatures 222 and 224 may represent information from the same mobile communication unit, so have been denoted with the same numerical index '1A' in identification data ID1A. Signatures 222 and 224 may have been collected by the same mobile communication unit as signature 212, which also has numerical index '1', in anonymized database 210.

Signature 226 has numerical index '2' within identification data 'ID2A', and may have been collected by the same mobile communication unit as signature 214, which also has numerical index '2', in anonymized database 210. Signatures 228 and 230 may have been collected by other mobile communication units, for which no signature is shown in anonymized database 210.

Signatures 222, 224, 226, 228 and 230 may contain a variety of other information. Mobile communication units when in communication with a cellular network, will report various RF and control data in the life of a data connection or voice call. Various parts of this data may be available to a phone app or may be added to a social database, so may be included in some or all of signatures 222, 224, 226, 228 and 230. In cases where not all mobile communication units that contribute to app database 220 have the same applications and hardware, the signatures in app database 220 may not all have the same data fields.

Consider now the situation where signatures 212 and 222 were obtained from the same mobile communication unit at the same time. In this case, location data LOCAT1 will correspond to LOCAT1A, and timestamp T1 will correspond to T1A. In this case, a reference signature can be created by combining at least a part of the signature 212 with at least a part of signature 222. The radio frequency measurement information RF1 of signature 212 may be combined with either all or part of signature 222. Thus a first reference signature has been created by synthesising together a 'first signature' 212 from anonymized database 210 and a 'second signature' 222 from app database 220. Previously known approaches did not make such links between signatures in databases such as anonymized database 210, and databases such as app database 220.

There may be very great variation in the amount of RF information stored with each of the signatures in app database 220. There may also be greatly varying degrees of precision and accuracy in the location information stored with each of the signatures in app database 220. As a consequence of this variation, the parts of a first signature from anonymized database 210 that are added to, and improve upon, what is contained in the corresponding second signature in app database 220 will vary from signature to signature. As a consequence, the new reference signatures created by the present invention will normally not be uniform, i.e. they will not be homogeneous in the types, precision and accuracy of the information that they contain.

When the method of the invention is repeated, it may be possible to create a link between many, or possibly all, entries in anonymised database 210 and the corresponding signatures for the same call in app database 220. Effectively, the two databases are being combined, to provide many new reference signatures. In one embodiment, app database 220 of 'second' signatures can simply be augmented, by the addition into app database 220 of radio frequency measurement information, for those 'second signatures' for which it has been possible to find a match to the same 'first signature' from anonymized database 210. This approach allows the construction of inexpensive, complex reference signatures through the linking of information in anonymized database 210 and app database 220. Those reference signatures can then be used for many purposes, including the geolocation of other calls. The reference signatures created by the invention do not have to be held in either the anonymized or app databases, but can be held elsewhere in any suitable form of memory.

Figure 3:
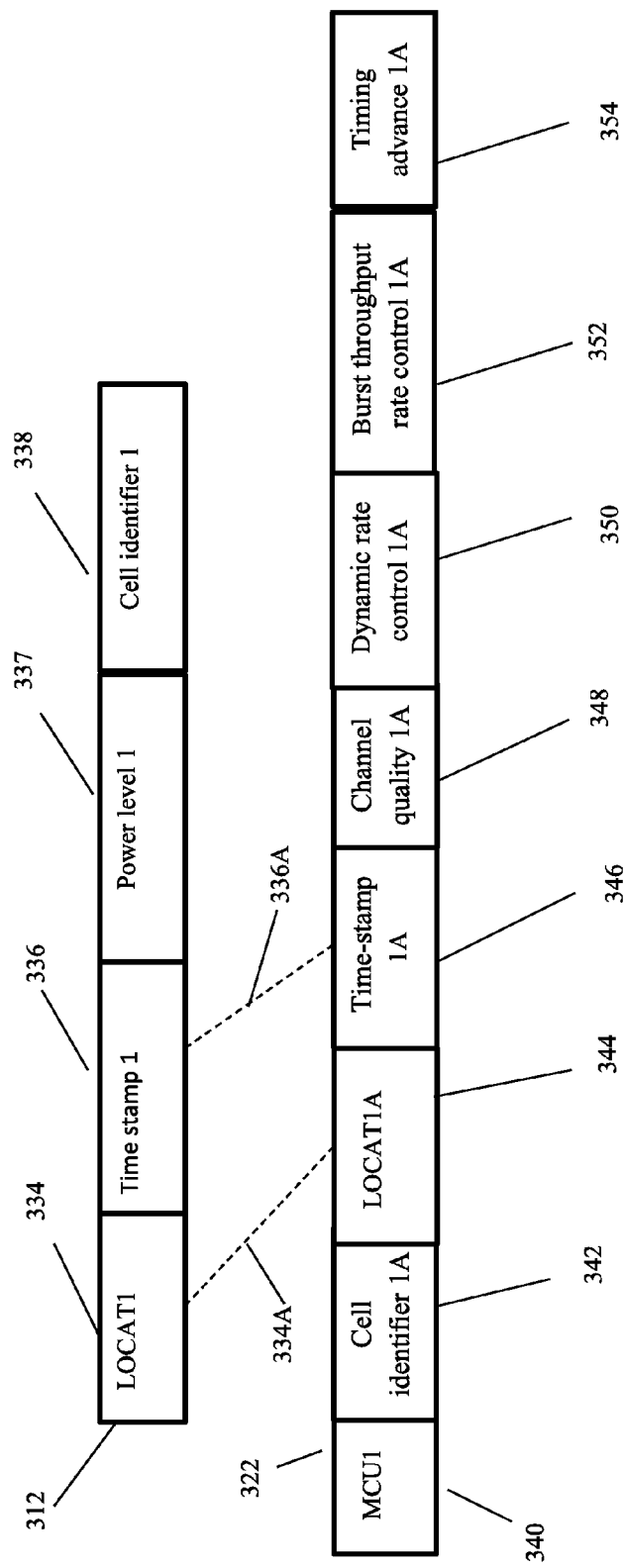
FIG. 3 provides more detail of the signatures in the databases of FIG. 2.

FIG. 3 provides more detail of signature 212 from anonymised database 210, and signature 222 from app database 230. These are represented as signature 312 and signature 322 respectively, in FIG. 3.

Signature 312 and signature 322 have been linked by using the location information and timestamps held in the two signatures. Although the timestamp recording of signatures 312 and 322 is likely to be recorded in milliseconds, the precision of their location measurements depends on how they are made. A threshold distance difference may be set, within which two location measurements are considered to match. Similarly, a threshold time difference may be set, within which two timestamp measurements are considered to match.

Signature 312 from anonymous database 210 has been illustrated as comprising multiple measurements. Each of these measurements has numerical index 1, to conform to the index 1 used in FIG. 2 for signature 212

Signature 312, in this example, comprises: Location information LOCAT1, with reference 334; 'Timestamp 1', with reference 336; 'Power Level 1', with reference 337; and 'Cell identifier 1', with reference 338. Power Level 1 is an example of radio frequency information. Other examples of radio frequency information that may be included in signature 212 are received signal strength and received signal quality.

Signature 322 from app database 220 has also been illustrated as comprising multiple measurements. Each of the measurements has index 1A, to conform to index 1A used in FIG. 2 for signature 222. Signature 322 is an example of a signature from a high specification mobile communication unit, which has been equipped with an app that is designed to measure or extract both location information and parameters of the signal received by the mobile communication unit. When an app is installed in a mobile communication unit, the mobile communication unit usually carries out the measurement. The app may extract and report the measurements that are made by the phone and shown in signature 322.

Signature 322, in this example, comprises identification information 'MCU1', reference 340, which identifies the mobile communication unit from which signature 322 was obtained. 'Cell identifier 1A' with reference 342 indicates the cell from which the measurements shown as references 348-354 were received. Additional measurements in signature 322 include: Channel quality indicator 1A, reference 348; Dynamic rate control 1A, reference 350; Burst throughput rate control 1A, reference 352; Timing advance 1A, reference 354. Signal to noise ratio and channel quality indicator are examples of quantities used in 'dynamic rate control'. However the dynamic rate control shown by reference 350 may be based on other parameters than signal to noise ratio and channel quality indicator.

Signature 322 may comprise other cell identifiers, which are not shown on FIG. 3. From each of those other cells, measurements corresponding to references 348-354 may be received and included in signature 322, although these are also not shown on FIG. 3. Signature 322 also comprises location information LOCAT1A, with reference 342; and 'Timestamp 1A', with reference 346.

As shown with dotted line 334A, LOCAT1 has been found to correspond to LOCAT1A. Dotted line 336A indicates that Time Stamp 1 has been found to correspond to Time Stamp 1A. The match between signatures 312 and 322 indicates that they were made by the same mobile communication unit MCU1 at the same time. Signatures 312 and 322 are in fact two different reports of the same connection, by the same mobile communication unit, at the same time. They may, in some circumstances, be two different parts of the same report of the same connection.

Similar correspondences to those shown as 334A and 336A in FIG. 3 may also be found between measurements of parameters in signature 214 from anonymized database 210 and signature 226 from app database 220. Such correspondences would indicate that signatures 214 and 226 were both made by a mobile communication unit with identification information ID2A shown in signature 226, and they were made at the same time and location.

Figure 4:
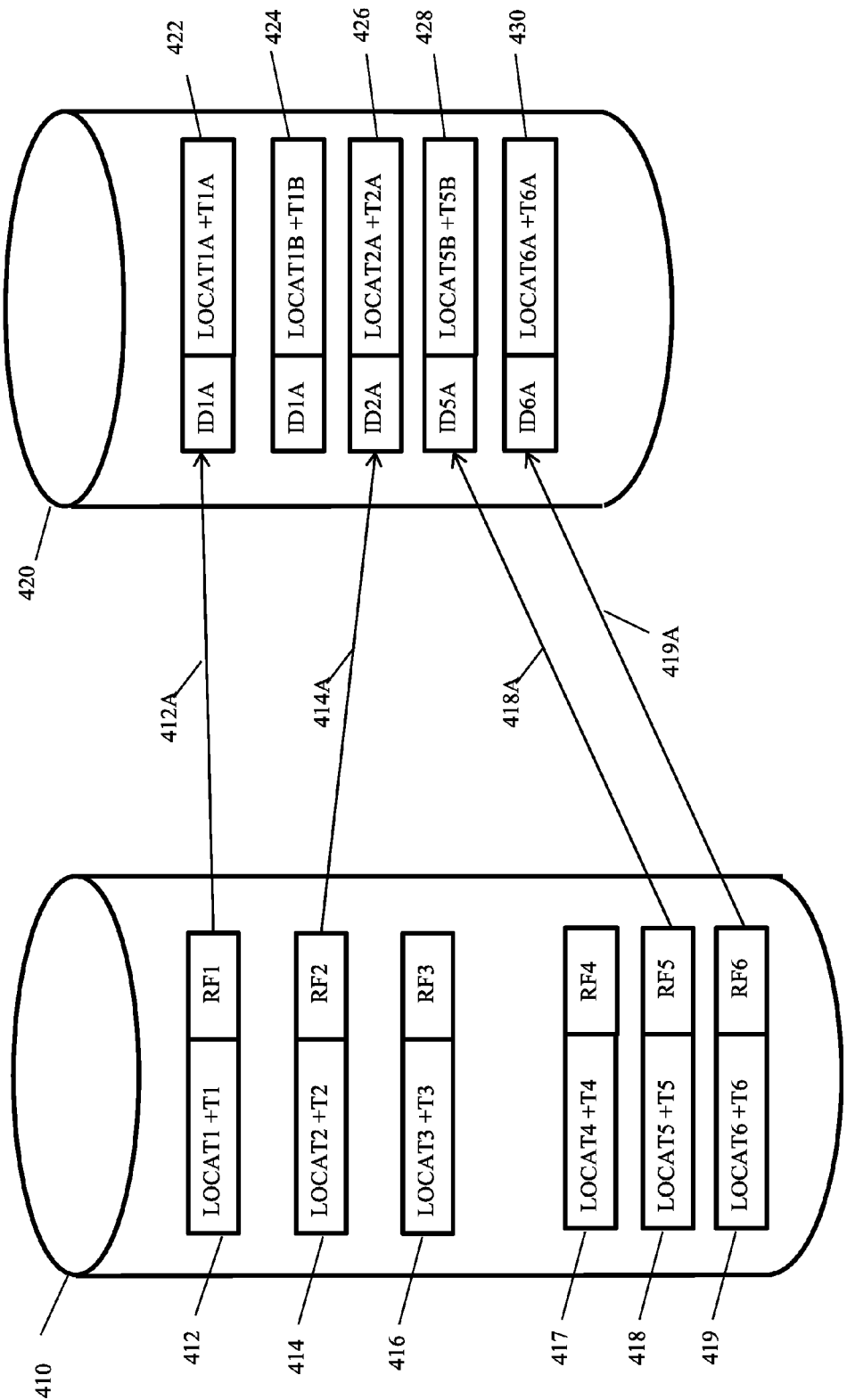
FIG. 4 illustrates matching between signatures in the databases of FIG. 2.

FIG. 4 illustrates the result of matching several signatures from an anonymized database with corresponding signatures in an app database.

Anonymized database 410 corresponds to anonymized database 210 in FIG. 2. App database 420 corresponds to app database 220 in FIG. 2. The reference numerals of signatures in both databases correspond to those shown in FIG. 2. In addition, anonymized database 410 has further signatures 417, 418 and 419.

Using the techniques described with reference to FIGS. 2 and 3 above, the matching shown by arrows 412A, 414A, 418A and 419A has been achieved. New reference signatures can be created from each of the signature pairs: 412 and 422; 414 and 424; 418 and 428; 419 and 430.

Signature 417 has not been matched to any signature in app database 420. So signature 417 does not lead to the creation of a new reference signature. Signature 417 could still be retained for use in some applications, but clearly the contents of the signature have not been augmented by combining it with any signature from app database 420. Alternatively, signature 417 could be disregarded. Although not shown in FIG. 4, there may be many more signatures in app database 420 for which no match is found to a signature in anonymized database 410. Again, these signatures may be used or disregarded. The decision whether to use or disregard any signature in anonymized database 410 or app database 420 for which no match is found may depend on some or all of the following considerations: (i) How much RF information there is in the signature; (ii) How many new reference signatures have been successfully created; (iii) The exact use to which the new reference signatures are to be put. On this last point, in one example of use, it may be a requirement that the created reference signatures have identification data. In this case, unmatched signatures from app database 420 may be used, but unmatched signatures from database 410 will be discarded or ignored.

Figure 5:
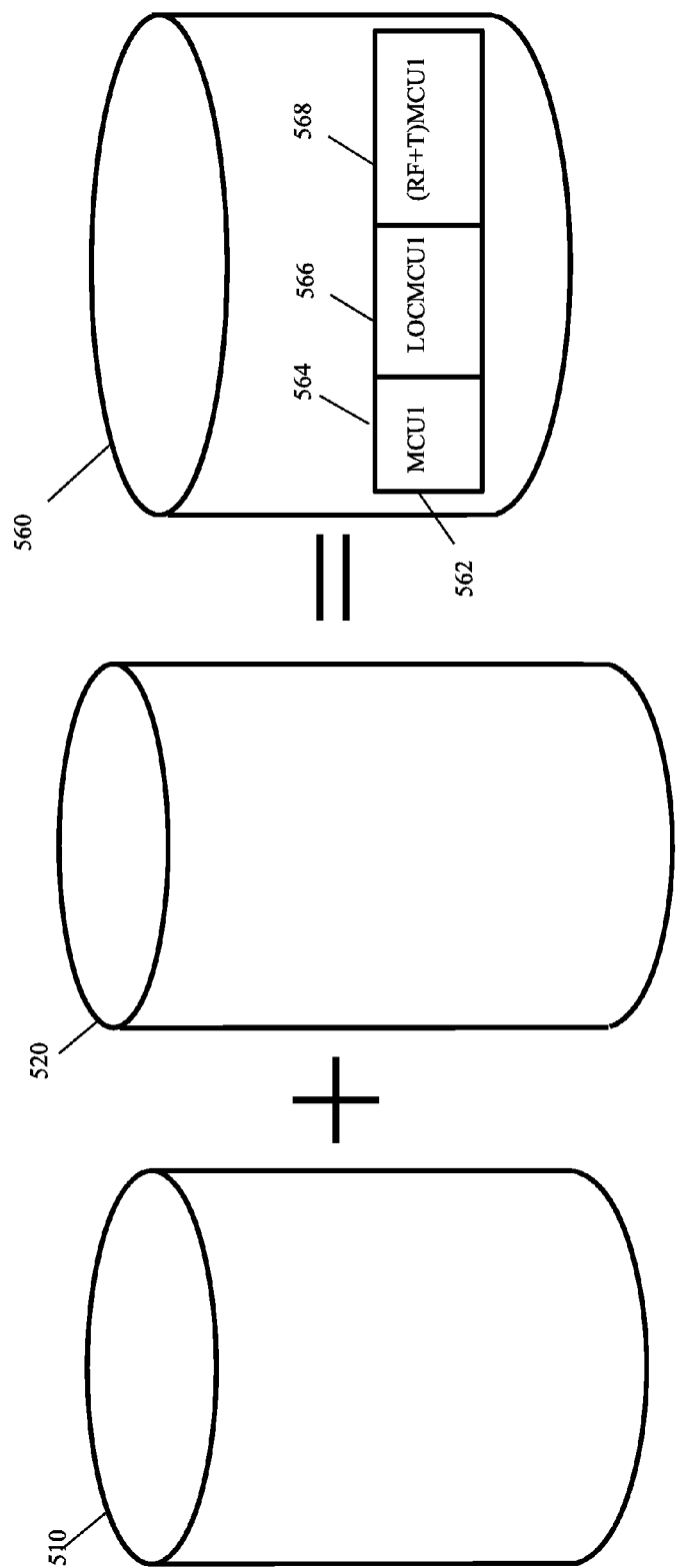
FIG. 5 illustrates the creation of a database of reference signatures.

FIG. 5 illustrates in general terms the combining of anonymised database 510, and app database 520. This is achieved by linking many signatures from anonymised database 510 to corresponding signatures in app database 520. Anonymised database 510 is symbolically illustrated as being added to app database 520 to form a database 560 of reference signatures. One reference signature 562 is illustrated in database 560.

Reference signature 562 is a synthesis of signatures 412 and 422 of FIG. 4. Reference signature 582 generally comprises field 564, which shows the identity information of a mobile communication unit MCU1. The entry in field 564 is based on the identity information ID1A from signature 422. Field 566 indicates a location 'LOCMCU1' for mobile communication unit MCU1. LOCMCU1 may be the location information LOCAT1A from reference signature 422, the location information LOCAT1 from reference signature 412, or some combination of both. Field 568 generally indicates, as (RF+T) MCU1, other information about the reference signature 562, which will be based on a combination of the individual data from both signatures 412 and 422. The data in field 568 may, for example, be one or both of timestamps T1 and T1A, together with all or part of the data shown with references 337, 338 and 348-354 in FIG. 3. Other data may be included. Alternatively, reference signature 562 may be stored in database 560 without field 564 indicating the identity of the mobile communication unit MCU1.

Within database 560, some reference signatures will normally contain data in only some of the fields shown for reference signature 562. In addition, some reference signatures in database 560 may show additional fields to those illustrated for reference signature 562. The collection of reference signatures in database 560 is unlikely to be heterogeneous in many applications of the invention to real data from wireless communication systems. The variability of the reference signatures in database 560 is dependent on how complete the information is in the various 'first' and 'second signatures' held by anonymised database 510 and app database 520 respectively.

Although the database 560 of reference signatures is shown separately from both anonymised database 510 and app database 520, this is not necessarily the case. If information from signatures in app database 520 is instead added into anonymised database 510, it may be anonymised database 510 that eventually stores the reference signatures. Likewise, if information from signatures in anonymised database 510 is instead added into app database 520, it may be app database 520 that eventually stores the reference signatures.

Use of Reference Signatures with Identity Information

The following example illustrates the use of a database 560 of reference signatures 562, when those signatures have field 564 comprising identification information for a mobile communication unit such as MCU1.

An anonymised database 510 may allow general trends and overall network statistics to be derived. For example, coverage 'holes' in a small portion of a sector may be identified. In addition, 'hotspots' of usage within a sector may be identified. These may be areas within a sector where many users cluster together, or where heavy users of data are located. Anonymised database 510 will not, however, allow an individual heavy data user to be identified, nor will it allow the quality of service or usage patterns of an individual user to be monitored. This is important, for example, where either a user or a small group of users is experiencing problems with the network, such as poor coverage or capacity. If these users can be tracked, their usage patterns can then be identified. Any network issues experienced by them can be highlighted. The AriesoGeo™ system from Arieso is one approach to providing such solutions. In the case of some users, particularly high standards of service quality must be offered, either at all times or when the user is in specific areas. Thus the ability to identify some signatures in database 560, by the user or mobile communication unit identity, is of great value in supporting the needs of this subset of users.

A reference signature 562 that lacked identity information would not allow specific categories of user to be delineated and characterised, as a group. For example, any user downloading more than 10 Gb/month might be classified as a heavy user of data. The availability of identity information for many reference signatures 562 makes it significantly easier to work out which users do have such high data needs. With database 562, a network operator may be able to do more than just identify who the heavy users of data are. It may be possible, for some of them, to find out when and where they use the network. For example, there may be little impact on the network if the heavy data usage is predominantly at a quiet time or on a little-used part of the network. However, another user with comparable heavy data usage might predominantly use data at a capacity constrained part of the network, at busy times. It may also be possible to see if such usage is a growing trend at a certain time of the day or week, or in a certain location. Hence the reference signatures 562 can be used in a chain of investigation. That investigation may result in pre-emptive network upgrades, without significant adverse impacts on service provision arising before the need for an upgrade is apparent.

Thus an embodiment of the invention in which identity information from second signature 422 is added to information from first signature 412, involves the creation of reference signatures with valuable attributes.

Reference Signatures Based on Various App Database Signatures

The signatures in app database 520 may come from one or several of a variety of sources. Typical origins of signatures in app database 520 will be: (i) Social networking applications/sites. (ii) Existing 'smartphone apps'. Some users already accept the collection of data by these apps, in return for the primary service being offered by the app itself. These apps are not specifically designed to work with the present invention, but will often obtain and provide some data about the signals that they receive from the network. (iii) Bespoke apps, designed to provide location, RF and other data, specifically tailored to the needs of the present invention. Signature 322 in FIG. 3 might originate, for example, from an existing app as described in (ii), or from a bespoke app as described in (iii).

In the case where the mobile communication unit is a smartphone, the smartphone performs signal measurements and data gathering. Reports of these measurements are used in such activities as cell site selection/handoff. The smartphone reports the information to the network. The network then stores some or all of this information. This information may feed into the network's Operation Support System (OSS) database.

Some apps, such as for example social networking apps, can gather and report a very rich array of information from the user, in addition to the basic measurements that the phone makes. Such apps can, for example, glean information on what the phone is using its data for at any a given point in time. Thus information may be available on time or data volumes involved in e-mailing, video calling, or downloading content, for example. This information allows the building of a profile of a given user, provided that identity information is available for the user. The network operator can then personalise tariffs or incentives, down to the level of an individual user. In an embodiment where database 560 is updated in real time, these adjustments can be made with minimal delay. In other embodiments, the analysis of such data consumption characteristics may only be at widely spaced intervals, for example monthly, and/or together with billing.

The Choice of Location Information for Each Reference Signature

In anonymized database 410, first signature 412 has location information 'LOCAT1'. Second signature 422 in app database 420 has location information 'LOCAT1A'. First reference signature 562 in database 560 has location information 'LOCMCU1', which is derived from one or both of 'LOCAT1' and 'LOCAT1A'.

Apps that provide location information do so with the user's permission. The user may give this permission expressly, or through agreeing to the terms and conditions for using the app or the mobile communication unit. The app may make use of the positioning functionality, such as GPS circuitry/software, and thereby produce an accurate position report. Usually, such position reports are more precise than those derived through methods that have to be implemented within the network, such as triangulation and mast timing/signal propagation methods. Although Arieso's AriesoGeo™ system can estimate the location of a mobile communication unit accurately, any GPS measurement available from the mobile communication unit at the same timepoint will usually be more precise. So, when a position estimate such as 'LOCAT1A' in second signature 422 is available from positioning functionality within the mobile communication unit itself, that will be the position estimate that will be used in reference signature 562.

The location estimate 'LOCAT1' in first signature 412 may however be retained. Location estimate 'LOCAT1' may in fact be refined, using 'LOCAT1A'. This may provide improvements to the estimates of locations of other mobile communication units, which themselves lack built-in positioning functionality. In versions of Arieso's AriesoGeo™ system which refine position estimates iteratively, the location estimate 'LOCAT1A' may be used to improve upon, or in place of, location estimate 'LOCAT1' as a starting value for a location estimate.

Apps on mobile communication units may be of at least two broad types. The first type do not require location information in order to perform their main function in delivering the service that the user expects from them. One example is the 'torch' app for some smartphones. This app allows the user to manually turn on the high brightness LED that is normally used to provide 'flash' illumination for taking photographs with the smartphone. However, this app does collect significant volumes of data about the user, which is not used as part of the basic torch functionality. The data gathered may include the location of the smartphone, which is transmitted back to the developer of the torch app or a third party under a contractual arrangement with the developer or owner of the torch app. In turn, appropriate advertising, for example, may be sent to the smartphone, based on the data provided by the app.

The second type of app does make use of the user's location in delivering the service for which the app is provided. This usage may be core to the function of the app, or may be more peripheral. An example here would be a social networking app which allows users located near to each other to link up together. The social networking app will inform them that they are geographically close together, provided that this functionality is currently enabled, even if they were not previously aware that they are near to each other, and were only near to each other by chance. This facility allows unplanned meetings. To do this, the app depends on the derivation and exchange of reliable position information for each user's smartphone.

Figure 6:
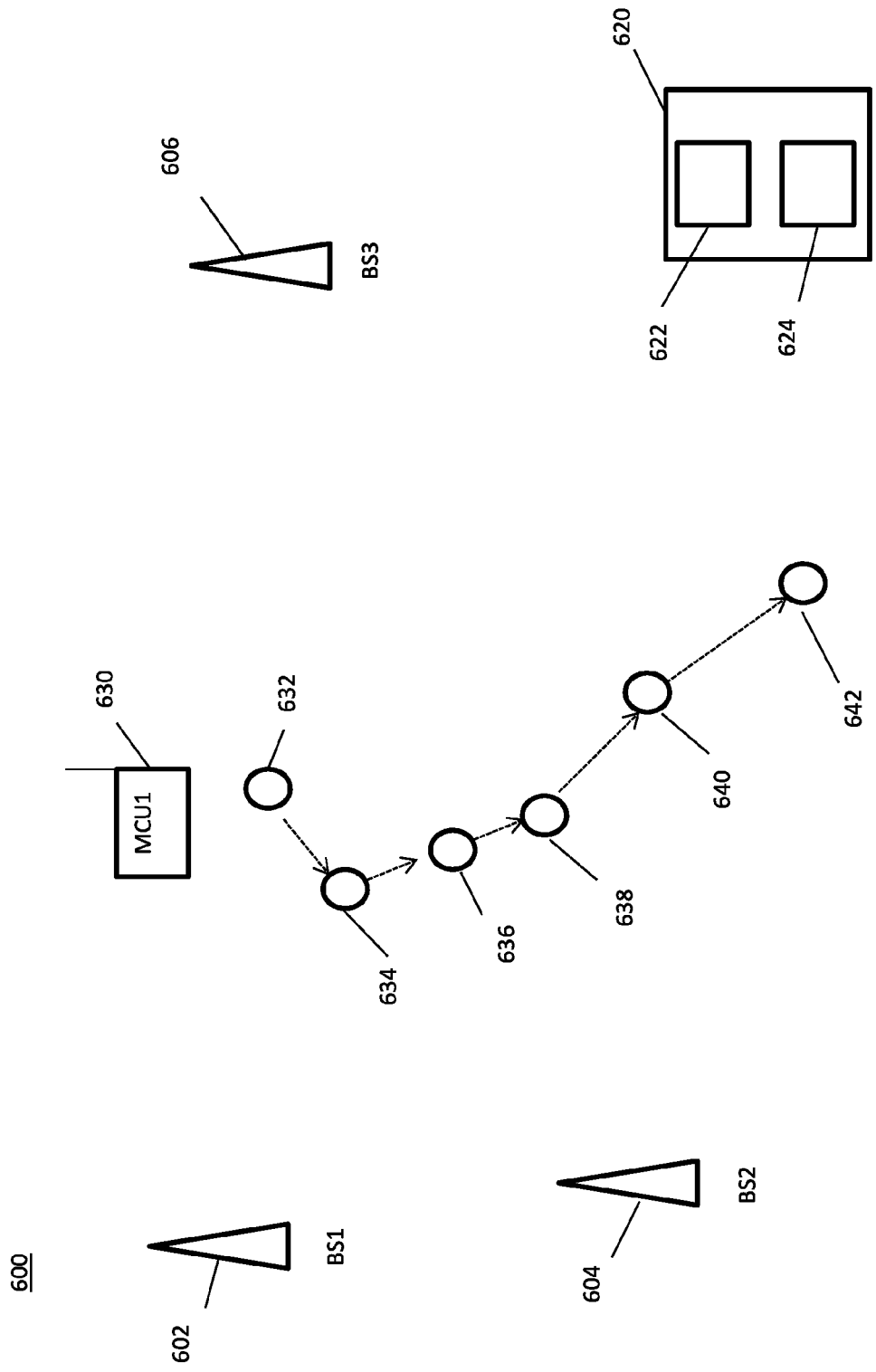
FIG. 6 illustrates locations at which signatures are recorded in a mobile communication system of an embodiment.

FIG. 6 illustrates a mobile communication system 600 in accordance with an embodiment of the invention. Mobile communication system 600 comprises base station BS1 with reference 602, base station BS2 with reference 604 and base station BS3 with reference 606. Controller 620 is linked to each of the base stations, and may function to implement the method of the invention. Alternatively, other elements of the mobile communication system 600 may implement all or part of the method of the invention.

FIG. 6 shows six successive locations 632, 634, 636, 638, 640 and 642 for a mobile communication unit 620. Mobile communication unit 620 is mobile communication unit MCU1, which was discussed in connection with signature 562 in FIG. 5. The following are examples of the signals produced by mobile communication unit 620: (i) When mobile communication unit 620 was at location 632, it may have provided signatures 412 and 422. (ii) When mobile communication unit 620 was at location 634, it may have provided reference signature 424.

Controller 620 manages calls within the wireless communication system 600. Controller 620 may comprise a processing module 622 that compiles and/or holds any or all of anonymized database 510, app database 520 and database 560. Processing module 622 may comprise or act together with a computer-readable storage device 624, which has executable program code stored within it for programming the signal processing module 622 to perform the method of the invention.

Figure 7:
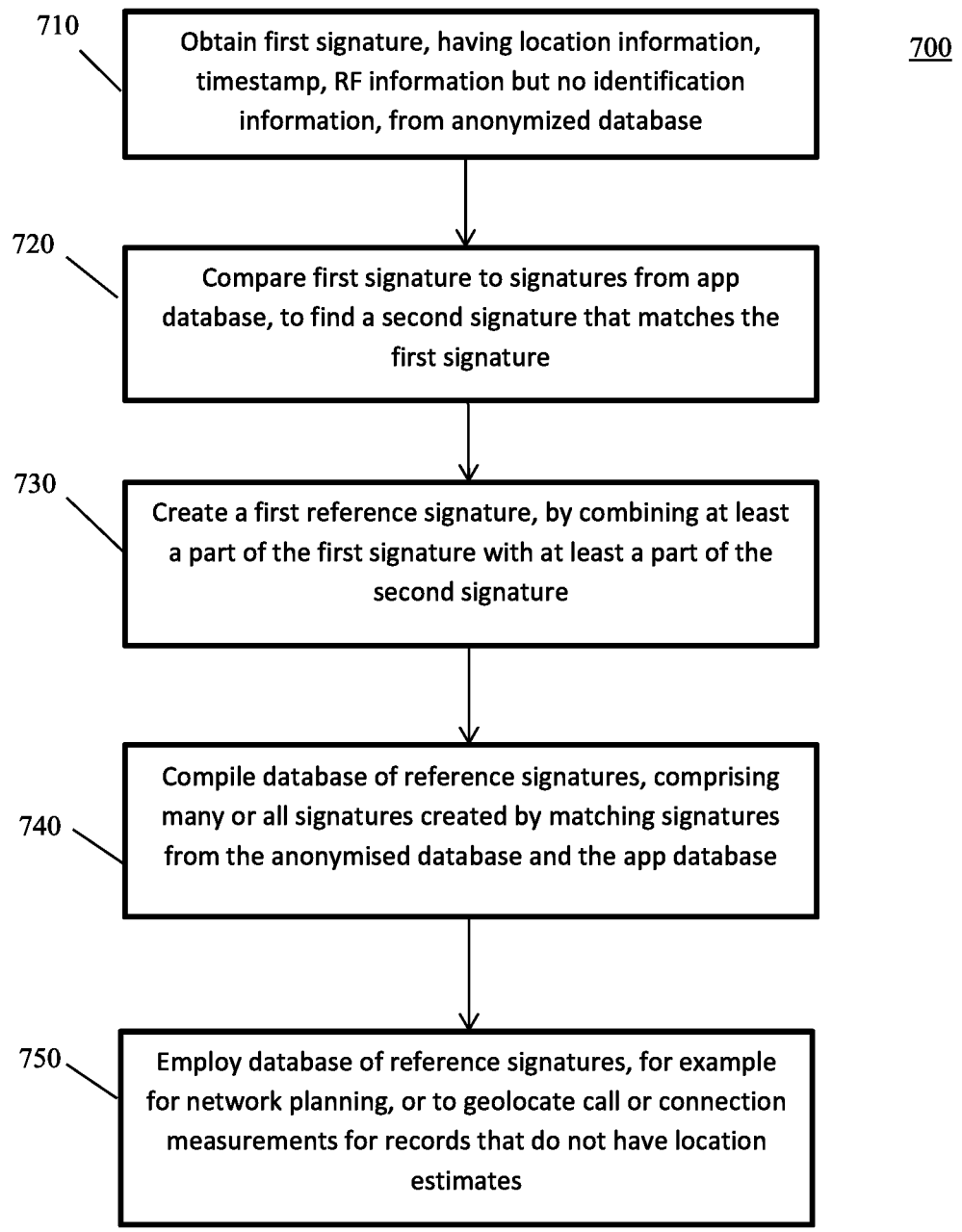
FIG. 7 illustrates a flowchart of a method of creating and using a database of reference signatures.

FIG. 7 illustrates a method 700 in accordance with the invention. In step 710, a first signature is obtained, either by extraction from anonymized database 510, or directly from a mobile communication unit In step 720, all or part of the first signature is compared with signatures in app database 520. At step 730, when a match has been found, a first reference signature is created. At least a part of the first signature is combined with at least a part of the second signature, and the resulting first reference signature is stored.

As shown at step 740, steps 710-730 are repeated and a database of reference signatures is compiled. As shown at step 750, the database of reference signatures is then used. This may be to look at activities of individual users, or parts of the network. The database of reference signatures may be used to geolocate records of other calls, for which no location information is known. The database of reference signatures can be used in methods such as that explained in U.S. application Ser. No. 13/369,591. The database of reference signatures may be used for network planning or network upgrades.

As has been described above, a location-rich but information-poor anonymized database can be used in concert with an app database, which may have diverse information in the different signatures within it. The resultant database of reference signatures may then aid in geolocating other calls or connections, which do not comprise location information. The reference signatures may involve Radio Frequency (RF) terms and control information, such as Channel Quality Index (CQI), burst rate, serving cell, etc.

The advantages of the invention may therefore include some or all of:

(i) Efficient, cost-effective generation of reference signatures;

(ii) Use of the standardized MDT feature from 3GPP, although other suitable anonymized databases could be used.

The method can be applied to many cellular telecommunications technologies that provide databases, such as LTE and UMTS.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of generating reference signatures for use in geolocation in a cellular wireless communication system, comprising:

obtaining a first signature for a mobile communication unit at a first location, the first signature comprising first location information, a first timestamp, and radio frequency measurement information, wherein the first signature is from an anonymized call that does not record identification information for the mobile communication unit that obtains the first signature;

comparing the first location information and the first timestamp to location information and timestamp information of signatures in a database, to identify a second signature from the database, the second signature having second location information and a second timestamp that correspond to the first location information and the first timestamp; and creating a first reference signature, by combining at least a part of the first signature with at least a part of the second signature.

2. The method of claim 1, wherein
the anonymized call is obtained in accordance with the Minimization of Drive Test 3GPP standard.

3. The method of claim 1, wherein:
the second signature is obtained from an application that is operational on the mobile communication unit, the second signature also comprising identification information for the mobile communication unit or a user of the mobile communication unit.

4. The method of claim 1, wherein:
the second signature is from a social media website, the second signature also comprising identification information for the mobile communication unit or a user of the mobile communication unit.

5. The method of claim 1, wherein creating the first reference signature further comprises:
combining at least a part of the radio frequency measurement information of the first signature with at least a part of the second signature.

6. The method of claim 5, wherein creating the first reference signature further comprises:
adding the at least a part of the radio frequency measurement information of the first signature into the database holding the second signature.

7. The method of claim 1, wherein:
the second signature comprises a user identifier, and at least one of the following types of control information not included in the first signature:
timing advance;
burst throughput rate;
dynamic rate control, comprising at least channel quality indicators; and
signal-to-noise ratio.

8. The method of claim 1, wherein the radio frequency measurement information of the first signature comprises at least one selected from:
signal quality; and
a cell identifier and corresponding observed power level.

9. The method of claim 1, wherein additional measurement data associated with the second signature comprises at least one from:
   signal quality;
   timing advance;
   burst throughput rate;
   dynamic rate control, comprising at least channel quality indicators; and
   signal-to-noise ratio;
   and wherein creating the first reference signature comprises combining the radio frequency measurement information of the first signature with the additional measurement data associated with the second signature.

10. The method of claim 1, wherein comparing the first location information and the first timestamp to location information and timestamp information of signatures in a database to identify the second signature further comprises identifying a second signature that matches the first signature, the second signature being identified as matching the first signature based on:
   determining that the second location information corresponds to the first location information, when the second location information matches the first location information within a predetermined measurement accuracy; and
   determining that the second timestamp corresponds to the first timestamp, when the second timestamp matches the first timestamp within a predetermined timing accuracy.

11. A non-transitory computer-readable storage medium storing a computer program of instructions configured to be readable by at least one computer processor for instructing the at least one computer processor to execute a computer process for performing the method of claim 1.

12. A cellular wireless communication system comprising a network and mobile communication units, the cellular wireless communication system operable to:
   obtain a first signature for a mobile communication unit at a first location, the first signature comprising first location information, a first timestamp, and radio frequency measurement information, wherein the first signature is from an anonymized call that does not record identification information for the mobile communication unit that obtains the first signature;
   compare the first location information and the first timestamp to location information and timestamp information of signatures in a database, to identify a second signature from the database, the second signature having second location information and a second timestamp that correspond to the first location information and the first timestamp; and
   create a first reference signature, by combining at least a part of the first signature with at least a part of the second signature.

13. The cellular wireless communication system of claim 12, wherein the cellular wireless communication system is operable to create the first reference signature by combining at least a part of the radio frequency measurement information of the first signature with at least a part of the second signature.

14. The cellular wireless communication system of claim 12, wherein
   the second signature is from a social media website, the second signature also comprising identification information for the mobile communication unit or a user of the mobile communication unit.

15. The cellular wireless communication system of claim 12, wherein the second signature is obtained from an application that is operational on the mobile communication unit to gather location information and measurements of signal parameters for signals received by the mobile communication unit, the second signature also comprising identification information for the mobile communication unit or a user of the mobile communication unit.

16. The cellular wireless communication system of claim 12, further operable to create the first reference signature by adding the location information of the first signature into the database holding the second signature.

17. The cellular wireless communication system of claim 12, further operable to identify a second signature that matches the first signature, the second signature being identified as matching the first signature based on:
   a determination that the second location information corresponds to the first location information, when the second location information matches the first location information within a predetermined measurement accuracy; and
   a determination that the second timestamp corresponds to the first timestamp, when the second timestamp matches the first timestamp within a predetermined timing accuracy.

18. The cellular wireless communication system of claim 12, further comprising:
   a database of reference signatures for geolocation, wherein the cellular wireless communication system is operable to populate and update the database with reference signatures, each reference signature comprising a combination of at least a part of a first signature from an anonymized database and at least a part of a second signature from either:
      an app on a mobile communication unit; or
      a social media website.

* * * * *